(12) United States Patent
Cohen et al.

(10) Patent No.: US 7,167,914 B2
(45) Date of Patent: Jan. 23, 2007

(54) SYSTEM AND METHOD FOR INCREMENTAL AND REVERSIBLE DATA MIGRATION AND FEATURE DEPLOYMENT

(75) Inventors: Jules S. Cohen, Seattle, WA (US); Jacob Sidney Gur, Redmond, WA (US); Paul K. Kromann, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 315 days.

(21) Appl. No.: 10/828,726

(22) Filed: Apr. 21, 2004

(65) Prior Publication Data

US 2004/0210643 A1    Oct. 21, 2004

Related U.S. Application Data

(62) Division of application No. 09/768,446, filed on Jan. 24, 2001.

(51) Int. Cl.
*G06F 15/16* (2006.01)
*G06F 15/173* (2006.01)

(52) U.S. Cl. .............. 709/223; 709/203; 709/217; 709/245; 715/744; 715/745; 717/168; 717/174

(58) Field of Classification Search ......... 709/217, 709/218, 245, 223, 203; 715/530, 733, 744–745, 715/804; 717/168–178; 725/80
See application file for complete search history.

(56) References Cited

U.S. PATENT DOCUMENTS 5,708,812 A * 1/1998 Van Dyke et al. ......... 717/171
6,006,265 A   12/1999 Rangan et al. ............. 709/226
6,112,240 A   8/2000  Pogue et al. .............. 709/224
6,425,125 B1* 7/2002  Fries et al. ............... 717/168
6,604,236 B1* 8/2003  Draper et al. ............. 717/170
6,625,622 B1* 9/2003  Henrickson et al. ....... 707/204

(Continued)

FOREIGN PATENT DOCUMENTS

JP    11154086    *  6/1999

(Continued)

OTHER PUBLICATIONS

Kamoun, Farouk, "A Drop and Throttle Flow Control Policy for Computer Networks", *IEEE Transactions on Communications*, 1981, 29(4), 4-12.

(Continued)

*Primary Examiner*—Frantz B. Jean
(74) *Attorney, Agent, or Firm*—Woodcock Washburn LLP

(57) ABSTRACT

A data migration throttle that supports the incremental and reversible migration of web site customization data from a client-side data store to a server-side data store. Initially, each user of the web site stores customization data, such as the user's zip code, in a cookies file together with a globally unique identifier (GUID) which identifies the user. In order to migrate data to a server side store, the throttle is set to a value. Each time a user contacts the web server a hash of the user's GUID is compared with the throttle value, and the user's data is migrated to the server if the hash value is less than the throttle value. The throttle may be lowered, thereby causing some users to revert to client-side storage of customization data.

3 Claims, 7 Drawing Sheets

U.S. PATENT DOCUMENTS

| | | |
|---|---|---|
| 6,662,230 B1 | 12/2003 | Eichstaedt et al. .......... 709/229 |
| 6,711,618 B1 | 3/2004 | Danner et al. .............. 709/228 |
| 6,742,028 B1 * | 5/2004 | Wang et al. ................ 709/223 |
| 6,889,376 B1 * | 5/2005 | Barritz et al. ............... 717/175 |
| 6,966,002 B1 * | 11/2005 | Torrubia-Saez ............. 705/51 |
| 2001/0034743 A1 | 10/2001 | Thomas ................... 707/501.1 |
| 2002/0007402 A1 | 1/2002 | Thomas Huston et al. . 709/217 |
| 2002/0069261 A1 | 6/2002 | Bellare et al. .............. 709/218 |

FOREIGN PATENT DOCUMENTS

| | | | |
|---|---|---|---|
| JP | | 11296349 | * 10/1999 |

OTHER PUBLICATIONS

Radeke, E., "federation and Stepwise Reduction of Database Systems", *Applications of Databases*, Litwin, W. et al., (eds.), *First Int'l Conf.*, Jun. 21-23, 1994, 381-399.

Covington, M. et al., "Challenges of Migrating Legacy Data to a Distributed Capacity Repository", *IT Technical Journal*, Jul.-Aug. 1996, 13(4), 30-34.

Kimball, R., "Mastering Data Extraction", *Data Warehouse Architect*, Jun. 1996, 14-16.

Wu, Bing, et al., "Legacy Systems Migration-A Method and its Tool-Kit Framework", *Asia Pacific Software Engineering Conference and Int'l Computer Science Conference*, Dec. 2-5, 1997, 312-320.

* cited by examiner

SYSTEM AND METHOD FOR INCREMENTAL AND REVERSIBLE DATA MIGRATION AND FEATURE DEPLOYMENT

CROSS-REFERENCE TO RELATED CASES

This application is a divisional of U.S. patent application Ser. No. 09/768,446, entitled "System and Method for Incremental and Reversible Data Migration and Feature Deployment," filed Jan. 24, 2001.

COPYRIGHT INFORMATION

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention relates to the field of computing. The invention is directed generally to a system and method for the incremental and reversible deployment of software features and, more particularly, to a system and method for incrementally and reversibly migrating data from a client-side data store to a server-side data store.

BACKGROUND OF THE INVENTION

Software-based products or services can be modified by rewriting the software to provide new or different features. However, as is well-known, software often does not behave as expected. Thus, global deployment of a new software feature may have the effect of propagating a "bug" or other problem to the entire population of users. With the widespread use of computer networks such as the Internet, the issue of globally deploying a new software feature is particularly acute when the software is a widely-used web site, since a global deployment of the feature will affect a large number of users.

As one example, the architecture of a web site may be such that personalization information (e.g., the user's zip code, stocks to track, etc.) is stored on each client, and the administrator of the web site may wish to change this architecture such that the information is stored on a server. However, the new design or its implementation may present unanticipated bugs, scalability problems, etc. Making the change globally has the disadvantage of exposing the entire population of users to these problems, and also requires a great investment in resources (e.g., new server machines to store the personalization information) to deploy a feature that has not been tested in the real world.

Software manufacturers typically test their new software by providing "beta" releases to small segments of the population—generally on a volunteer basis. However, a beta-release does not allow the software manufacturer to dynamically adjust upward and downward the number of users who are using the tested feature. Moreover, this type of limited-release testing may not be readily applicable in all situations, such as where the feature to be tested relates to a large, publicly-accessible web site.

In view of the foregoing, there is a need for a system that overcomes the drawbacks of the prior art.

SUMMARY OF THE INVENTION

The present invention provides a technique for incremental and reversible deployment of a feature, so that the feature may be tested first on a small scale, and such that the scope of the deployment may be broadened or narrowed on demand. Incremental deployment of a new feature allows the effect of early-discovered "bugs" or other problems to be contained within a small segment of users, and also limits the investment of resource to support the feature (e.g. new computing equipment) while the feature is being tested. The technique of the invention is particularly well-adapted for testing new features on a widely-used public web site such as a portal site. The technique is particularly useful for incrementally deploying a redesign of the web site's architecture such that the location at which data is stored is changed from one place to another. However, it should be appreciated that aspects of the invention may be used to incrementally deploy other types of features in other contexts.

In accordance with the invention, a "throttle" is set which specifies the proportion of users to which a new feature is to be deployed. For example, the throttle may be set to 10%, indicating that the new feature should be deployed to 10% of all users. Each user of the product to which the new feature relates has an identifier associated therewith. For example, in the case where the product incorporating the new features is the Microsoft Network ("MSN") web site, each client (i.e., each "browser" program) that contacts the MSN web site has a globally unique identifier ("GUID") associated therewith which is uploaded to the web site at the time the web site is contacted. Whether the new feature is deployed to a particular client is determined based on the GUID and the value of the throttle. If the throttle is set at 10%, then 10% of all GUIDs are selected to receive the new feature. The selection of GUIDs (or other user identifiers) is performed in such a manner that an increase in the throttle selects additional users to receive the new feature without de-selecting those users who had been selected at lower throttle levels. For example, if the throttle is adjusted from 10% to 11%, all users who were selected at the 10% category remain selected at the 11% category. One way to perform the selection is to compute a hash value of a portion of the GUID, and to use the throttle as a "cutoff," whereby clients receive the new feature only when the hashed GUID is less than the throttle value.

The technique of the present invention may be used to incrementally relocate web site customization data from a client to a server. For example, the web site may initially maintain the customization data in the form of client-side cookies, and the administrators of the web site may wish to relocate this data to a centrally-located data store. However, deploying this change to all users at once would require the purchase of a relatively large number of servers to implement this untested data store, and would also require a large volume of data to be migrated to the data store all at once. According to the invention, a throttle may be set (e.g., at 10%) such that a small proportion of clients (identified on the basis of their GUID) are designated to migrate their customization data to the server and to use the server-stored data instead of client-stored data. Every time the client contacts the web site, the web site determines based on the GUID and the throttle whether to use the customization information from the server or the client. Mirror data may be stored on the client in order to support "reversibility"—i.e., if a scalability problem arises, the throttle may be turned down, and when the system determines that a particular GUID is no longer "throttled" to use server-side data, the client-side "mirror" copy of the data can be used. The mirror data may be destroyed or abandoned after the customization data has been migrated for all users (i.e., after the throttle has been turned up to 100%), and after the web site administrators have reached a level of confidence in the reliability of the feature.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

In a networked computing environment, data for use by one node in the network (e.g., a client) may be stored either at the client or at a central data-storage location (e.g., a server). In some cases, it may be desirable to change the architecture of the network, such that client-side data is migrated to a central data store. The use of a data migration throttle allows such an architectural change to be made in an incremental and reversible manner. While a throttle is described herein in terms of its use to incrementally migrate data from client-side storage to server side storage, it should be understood that this use is merely exemplary, and a throttle in accordance with the invention may be used to migrate data from one location to another, whether or not the locations can be characterized as "clients" and "servers." Moreover, apart from the data migration context, the throttle disclosed herein may be used to deploy other types of features that are unrelated to the migration of data.

Exemplary Computing Environment

Figure 1:
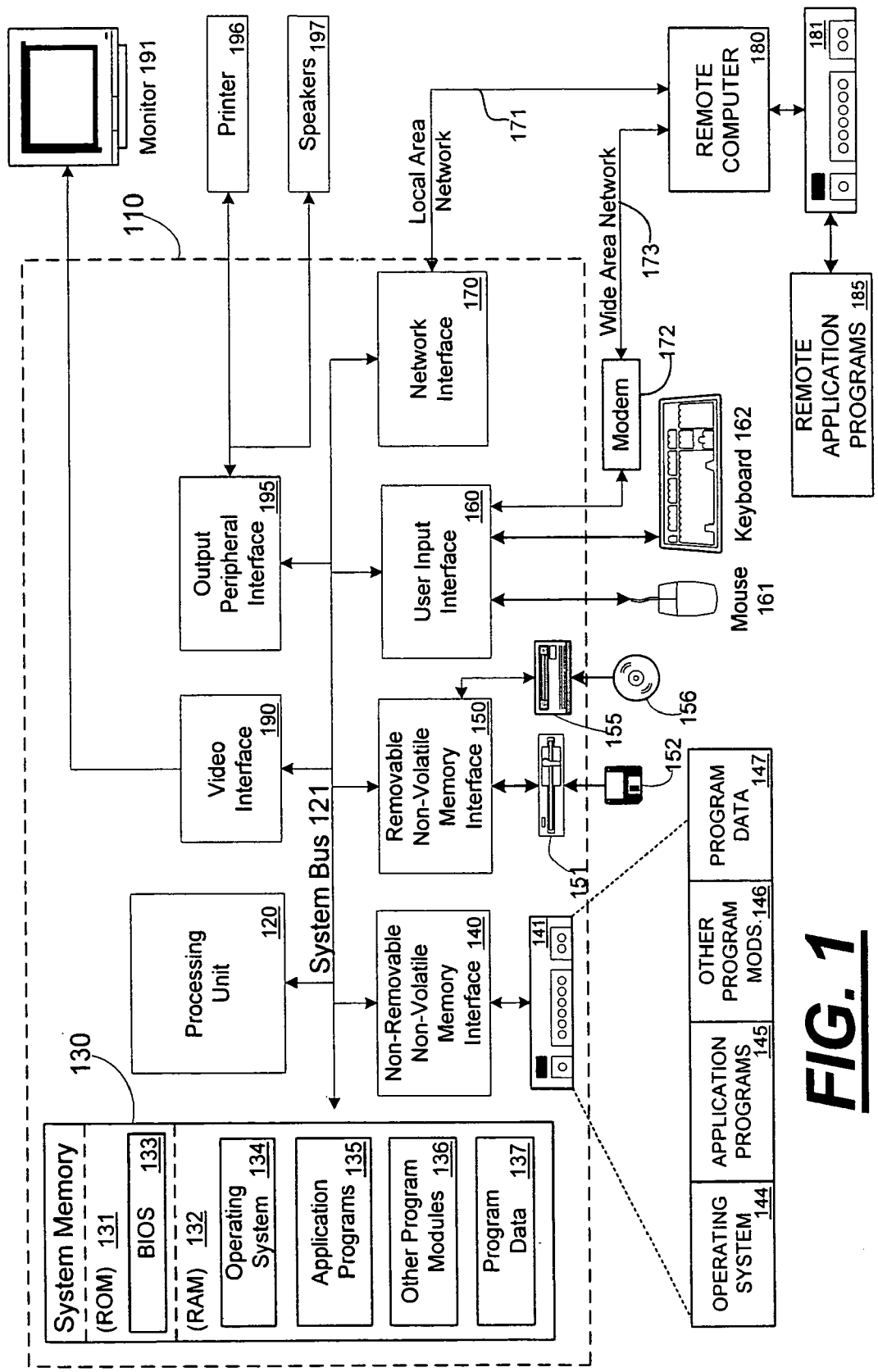
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Web Site with Customization Data

The present invention may be used to incrementally and reversibly migrate data associated with a web site, such as customization data. An exemplary web site employing such customization data is described with reference to FIG. 2, although it should be understood that the embodiment of the invention in a web-site data migration scheme is merely exemplary and is not limiting of the invention.

Figure 2:
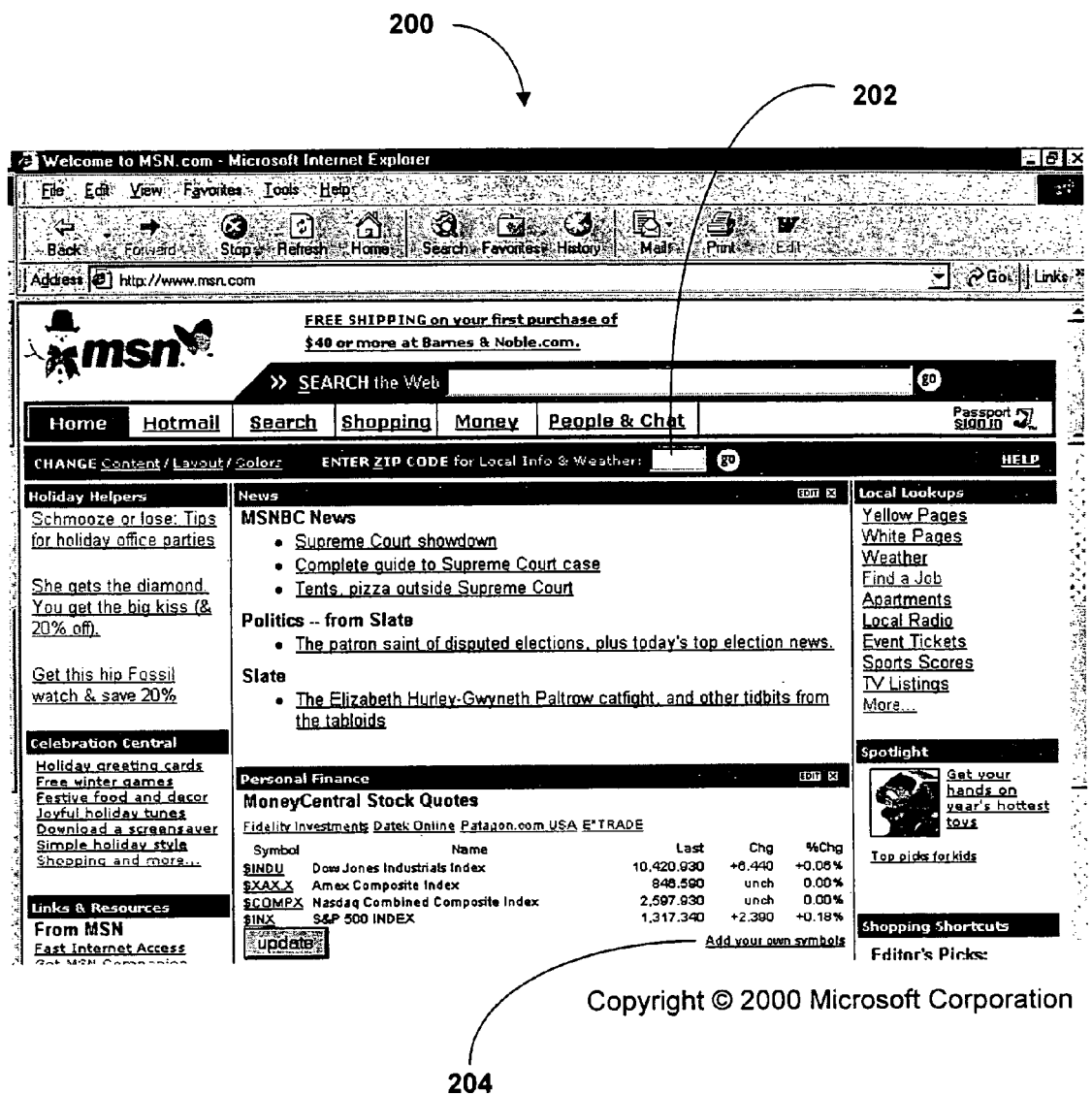
FIG. 2 is a diagram of an exemplary customizable web page for use with aspects of the invention.

FIG. 2 shows an exemplary web page 200, as displayed on a typical web browser. Web page 200 includes various opportunities for customization. For example, the user of the web page may enter his or her zip code in box 202. In the example of FIG. 2, entry of the zip code allows web page 200 to be customized such that "local info and weather" pertaining to that zip code will be displayed upon subsequent contacts to the web site by that same user. Similarly, exemplary web page 200 contains a hyperlink 204 that allows the user to enter particular stock symbols (e.g., stocks that the user owns or would like to track). The entered symbols are stored so that the current values of these stocks are displayed on the user's customized web page when the user contacts the web site. Exemplary web page 200 is an instance of the www.msn.com web site provided by Microsoft Corporation of Redmond, Wash., although it will be recognized by those of skill in the art that there are numerous examples of web sites which may be customized in the manner described herein.

Figure 3A:
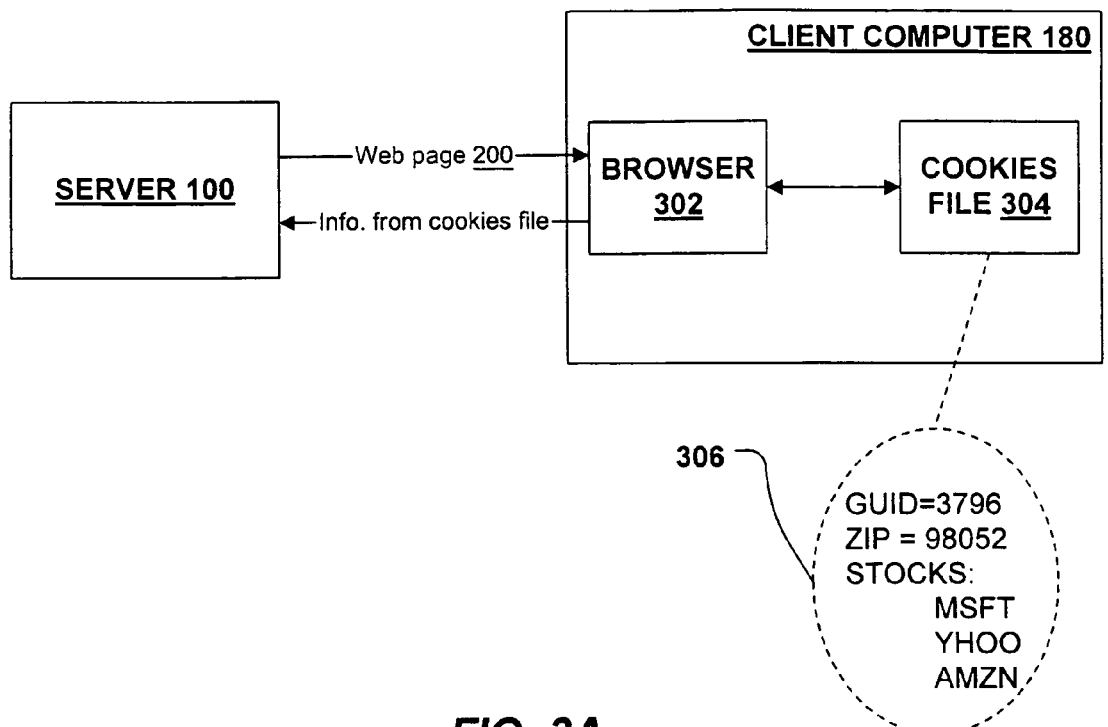
FIG. 3A is a block diagram of a client-server arrangement in which a customizable web page is delivered by the server to the client, for user with customization information stored at the client.

As noted, the zip code and the stock information are persisted in a data storage location. This location may be on the client or on the server. With reference to FIG. 1, it may be convenient to think of the server as computer 100, and the client as remote computer 180, where the two computers are connected by means of a network. In the case where the information is maintained on the client, the user's browser may maintain a "cookies" file that stores information relating to web sites that the user has contacted, including the customization information discussed above. FIG. 3A shows an example of such a configuration. In FIG. 3A, user computer 180 includes browser 302 and cookies file 304. Browser 302 is software that executes on computer 180, and cookies file 304 is a data file that is stored in a location accessible to browser 302. Cookies file 304 includes customization information 306, which, in this example, lists the user's zip code and various stock symbols. The user uses browser 302 to request web page 200 from web server 100. The web page is delivered to computer 180 over a communication channel such as the Internet, and is loaded into browser 302. When browser 302 contacts web server 100 to obtain web page 200, browser 302 causes computer 180 to transmit the information in cookies file 304 to web server 100. Web server 100 receives the information contained in cookies file 304 and uses this information to obtain appropriate custom information (weather report and stock quotes, in this example). This custom information is then rendered in a designated place on web page 200.

Figure 3B:
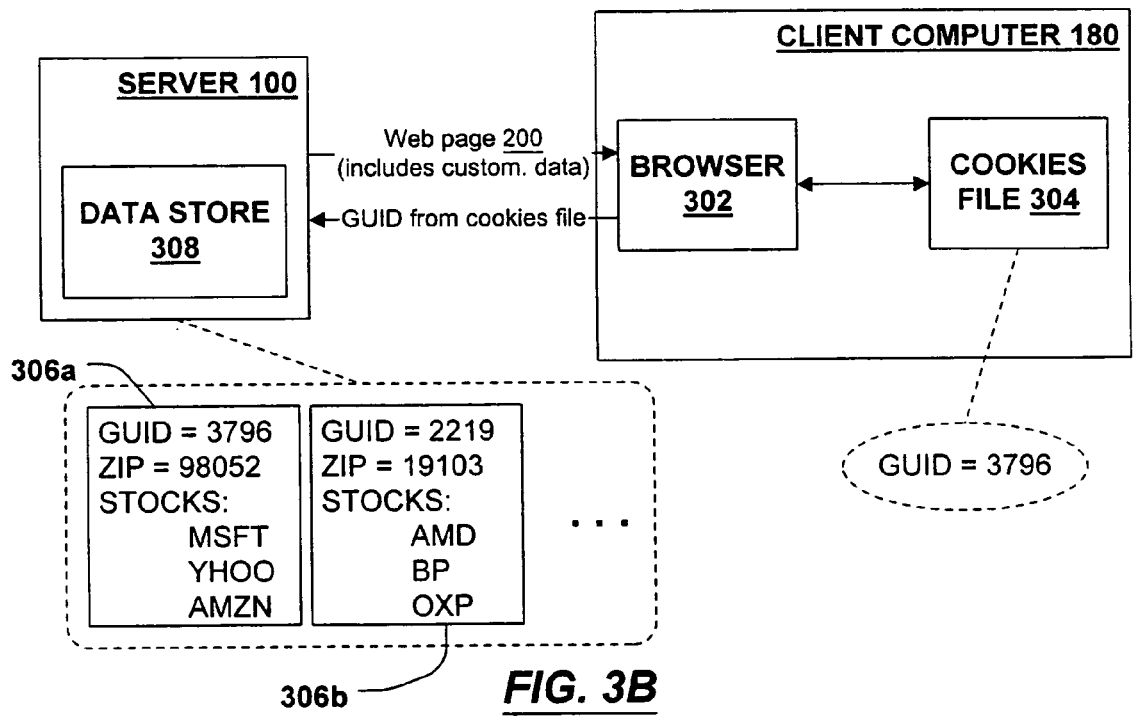
FIG. 3B is a block diagram of a client-server arrangement in which a customizable web page is delivered by the server using customization information stored at the server.

FIG. 3B depicts the alternative case in which the customization information is stored on a server or other central location. In FIG. 3B, the customization information is stored in data store 308 located on web server 100. Data store 308 actually stores a plurality of sets of customization information 306a, 306b, etc. In FIG. 3B, customization information 306a is the customization information for user computer 180, and it is identical to customization information 306 (shown in FIG. 3A). Each set of customization information in data store 308 relates to a particular user, where each user is identified by a GUID. The GUID is stored in the user's cookies file, so that the user (or, at least, the user's computer 180) can be identified to web server 100 whenever a contact is made between computer 180 and web server 100. In the example of FIG. 3B, when a user contacts web server 100, the user's GUID is uploaded from the cookies file to web server 100. The GUID is used to identify the appropriate customization information in data store 308 (e.g., customization information 306a), and the web page is customized by the web server for the appropriate client. For example, the web server may obtain the local weather and stock values specified in customization information 306a, and may add that information to the web page for delivery to computer 180.

Migration of Data from Client to Server

Figure 4:
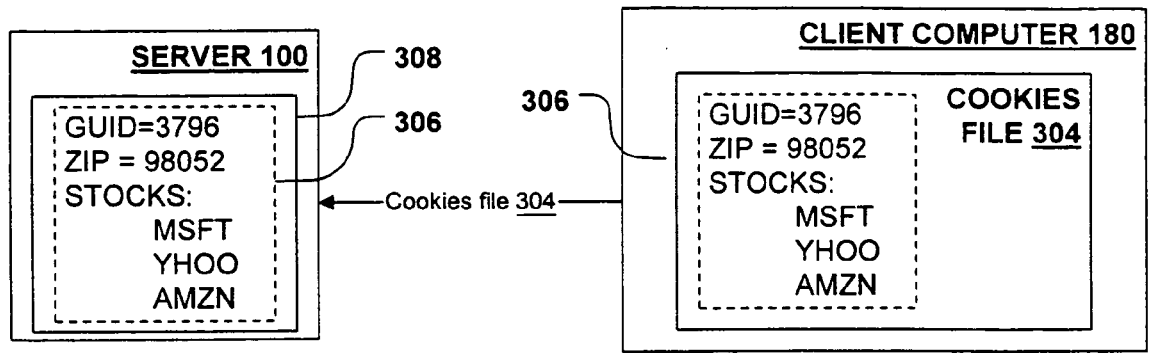
FIG. 4 is a diagram showing the migration of data from a client location to a server location.

The technique of the present invention may be used when the operator of the web site wishes to change from the scheme depicted in FIG. 3A to the scheme depicted in FIG. 3B. This change may be made by creating data store 308 and directing that the customization information stored in the cookies files on the disparate client machines be "migrated" from those cookies files to data store 308. As shown in FIG. 4, at the time of contact between the user's computer 180 and web server 100, web server 100 may simply direct that it receive a copy of the customization information 306 from the user's cookies file 304, and then store this copy in data store 308. However, if web server 100 performs this action for every user of the web site, then vast numbers of users may be exposed to the relatively untested code that implements data store 308, any bugs that may have been in that code, and any unanticipated scalability problems that may arise. Ideally, the code can be tested on a small sample of the users before being deployed to the entire population of users.

Figure 5:
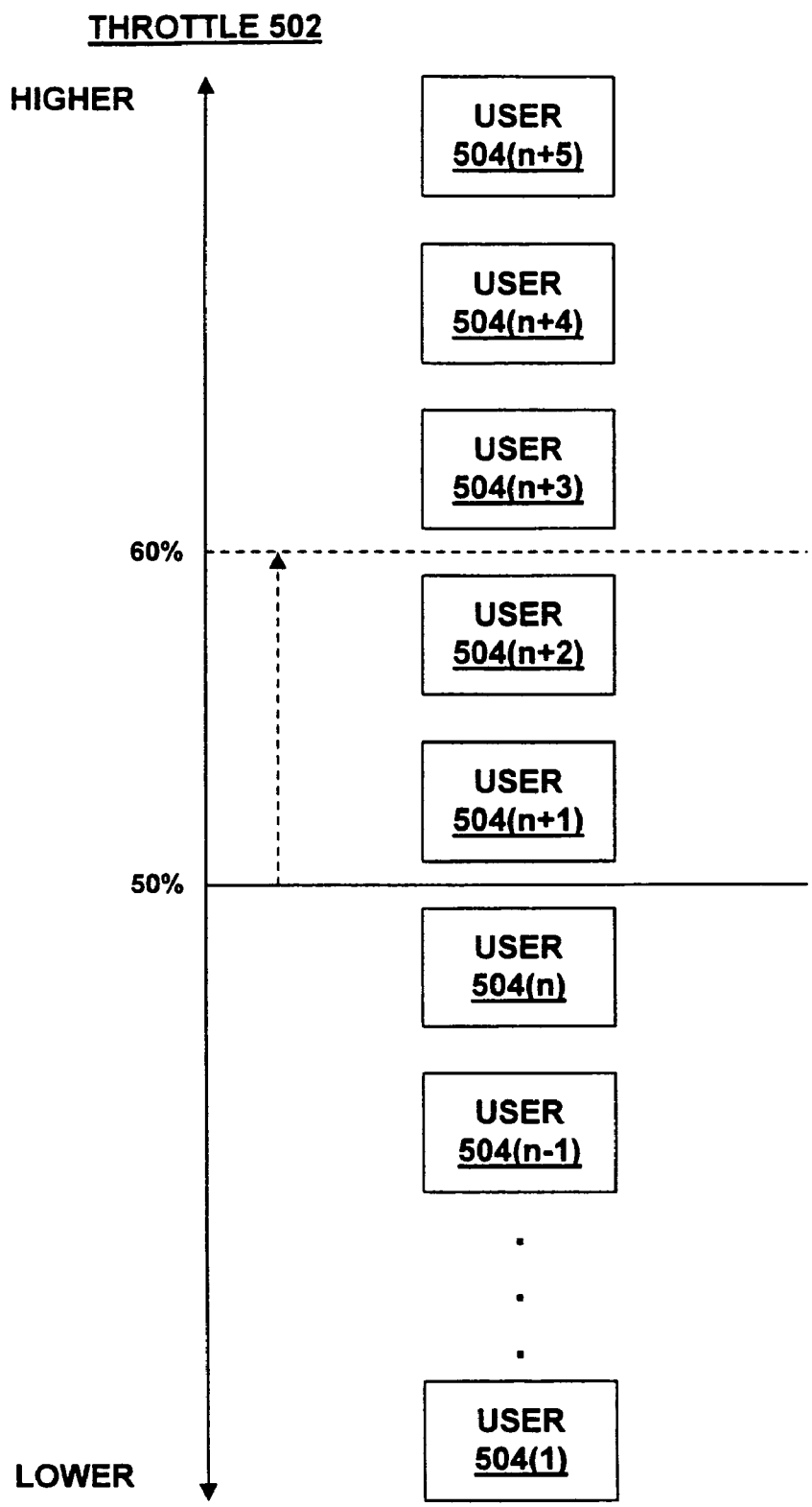
FIG. 5 is a block diagram of a throttle which selects users from among a plurality of users, in accordance with aspects of the invention.

A throttle in accordance with the present invention allows for the incremental and reversible deployment of centralized data store 308. FIG. 5 shows such a throttle. Throttle 502 determines the proportion of users who are selected to use data store 308. For convenience, selected users are referred to as being "throttled," and unselected users are referred to as being "unthrottled."

FIG. 5 shows a throttle 502 and a plurality of users 504(1) through 504(n+5). Each of the users is capable of being in the throttled or unthrottled state. In the example shown, the throttle is initially set at 50%, which means that 50% of the users are throttled (i.e., selected to use data store 308). In the example of FIG. 5, users 504(1) through 504(n) represent the users who are throttled at the 50% level. If the throttle is moved from 50% to 60%, then an additional 10% of the population of users is throttled. In the example shown, users 504(n+1) and 504(n+2) are added to the list of throttled users when the throttle is raised from 50% to 60% (although, in real-world use, the number of users added when the throttle increases from 50% to 60% percent would likely be much greater than two users). Users 504(n+3) through 504(n+5) remain above the throttle level, and are thus not throttled even when the throttle is turned up to 60%. It should be observed that increasing the level of the throttle from 50% to 60% does not select a completely different set of users to be throttled, but rather adds additional users to those who were already throttled at level 50%. Thus, if users 504(1) through 504(n) are throttled at 50%, they will also be throttled at 60%. Similarly, if the throttle is turned down from 60% to 50%, users 504(n+1) and 504(n+2) will be de-throttled, but users 504(1) through 504(n) will not be de-throttled.

FIG. 5 shows that that throttle 502 of the present invention throttles and de-throttles users in a defined order. This defined order eases reversibility. For example, suppose that the throttle is turned up from 50% to 60%, and unexpected scalability problems result (e.g., handling an extra 10% of users causes the speed of the system to drop unacceptably.) In this case, the throttle can be turned down from 60% to 50%, which simply results in turning off the data store feature for the most-recently throttled 10% of users (users 504(n+1) and 504(n+2), in the example of FIG. 5).

Figure 6:
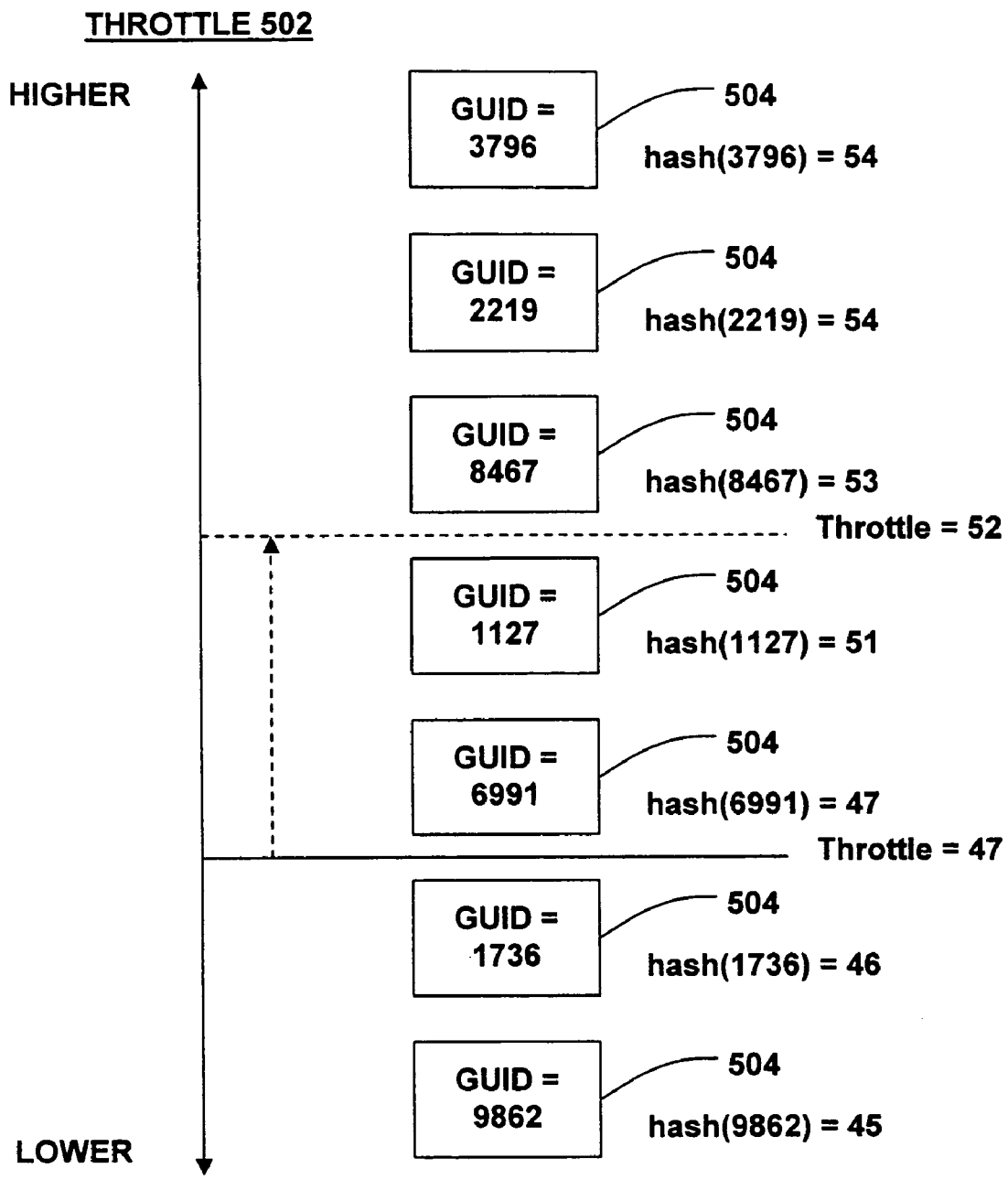
FIG. 6 is a block diagram of a throttle which incrementally selects users by using a hash function, in accordance with aspects of the invention.

The ordering of users is shown in FIG. 5 in its most general form. That is, FIG. 5 shows users as having been placed in a defined order according to arbitrary and unspecified criteria. FIG. 6 shows a preferred technique for defining the order among users. Each user is assigned a GUID which uniquely identifies the user. (In greater generality, the GUID need not represent the user, but could represent the user's computer, or any other unique entity.) For example, the GUID may be stored in cookies file 304. The GUID (or a portion thereof) may be hashed using a hash function. Thus, if hash() is the hash function and 3796 is the relevant GUID, then the operation $$\text{throttle\_index}=\text{hash}(3796)$$

produces the relevant value (i.e., throttle_index) for the purpose of determining whether the user having GUID=3796 is presently throttled. That is, if the user's throttle_index is less than the present setting of the throttle, then the user is throttled; if the user's throttle_index is greater than or equal to the present setting of the throttle, then the user is not throttled. The scheme of defining throttled users as those user's whose throttle_index is less than the present setting of the throttle is merely exemplary; it is equally correct to define the set of throttled users as those whose throttle_index is greater than the present setting of the throttle. In even greater generality, throttled users can be identified by determining whether the relationship between the throttle_index and the present throttle setting meets some arbitrary, pre-defined criteria.

FIG. 6 shows how hash values can be used in this manner. Each blocks 504 represents a user having a unique GUID. (As noted above, the GUID may actually identify the user's computer, rather than the user himself.) Next to each user, the hash of the user's GUID is shown. In FIG. 6, throttle 502 is initially set to 47. Thus, users whose GUIDs have hash values less than 47 (46 or less) are throttled. When the throttle is increased from 47 to 52, additional users (i.e., those having hash values less than 52) are throttled. As was the case in FIG. 5, the new users who are throttled after the increase in the throttle value are in addition to those who were throttled at lower levels; any users who were throttled at level 47 remain throttled at level 52.

One benefit of using a hash function to define the order in which users are throttled or de-throttled is that the hash function may be used to define the range of acceptable throttle_index values. For example, it may be convenient for the throttle operator to specify the throttle as a percentage of users who are selected to user data store 308. Thus, the throttle operator would like the throttle_index values to be in the range from 0–100. This can be accomplished by dividing the result of the hash function by 101 and using the remainder of that division as the throttle_index. Thus, the actual formula for deriving the throttle index may be:

throttle_index=hash(GUID)%101 where "%" is the module arithmetic operator, such that "x%y" is equal to the remainder when x is divided by y. (It will be recognized by those of skill in the art that the divisor is preferably a prime number, and thus it is preferably to use 101 as the divisor rather than 100.)

Throttle 502, as described above, is used to select particular users to utilize data store 308. In addition to providing a means for selecting users (such as throttle 502), the invention also provides an infrastructure that allows users to be incrementally and reversibly throttled. A description of that infrastructure follows.

Figure 7:
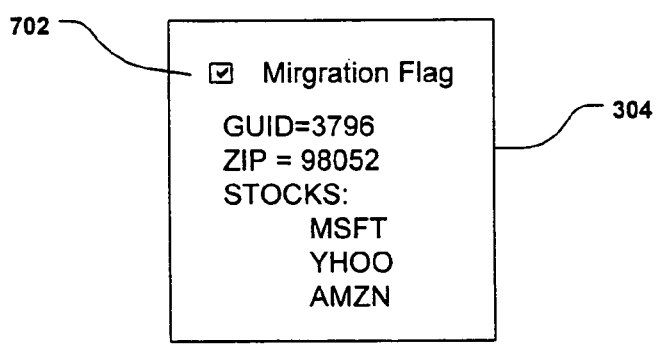
FIG. 7 is a diagram showing the structure of a cookies file entry with a migration flag, in accordance with aspects of the invention.

As noted above, each user has a cookies file 304. Initially, each user's cookies file stores customization data pertaining to that user. Also, each user (or, possibly, each user's computer) has a GUID associated therewith, which is stored in the cookies file. When it is desired to migrate customization data from the various users' cookies files to a centralized location such as data store 308 on server 100, web page 200 is modified to support the transition from client-based storage to server-based storage. First, web page 200 is modified to write a "migration flag" into each user's cookies file. FIG. 7 shows the format of the cookies file entry for web page 100, when such a migration flag exists. Each cookies file contains the user's GUID, migration flag 702, and customization data 306. Migration flag 702 may be either on or off. (In FIG. 7, migration flag 702 is shown as being "on," as indicated by the check mark.) Migration flag 702 is turned on at the time that the user's customization data 306 is migrated to data store 308. Migration flag 702 is turned off whenever client-side customization data is used. Thus, it will be observed that migration flag 702 is "on" for any "throttled" user who makes contact with web server 100, and is off for any "unthrottled" user who makes contact with web server 100. (Some inactive users who have not made contact with web server 100 since the deployment of data store 308 will not have a migration flag in their cookies files at all. It should be observed that web server 100 does not actively seek out users for whom data should be migrated (even if those users are "throttled"), but rather waits for users to make contact with web server 100.)

Additionally, web page 200 is reconfigured such that it retrieves and stores customization data 306 in either data store 308 or cookies file 304 depending on whether the user is throttled or unthrottled. Customization data for throttled users is retrieved from, and stored in, customization store 308; customization data for unthrottled users is retrieved from, and stored in, cookies file 304. Preferably, when a user is throttled a mirror copy of the customization data (and any changes thereto) continues to be stored in cookies file 304. It will be appreciated that the premise for the incremental deployment of data store 304 is that it is a new feature that needs to be tested. Since the storage of customization data 306 in cookies file 304 has presumably been established to be robust through long-standing usage, maintaining a mirror copy of the data allows for a reliable backup of that data while data store 308 is being tested. Also, by maintaining a mirror copy of the data, if a user is ever de-throttled, it is not necessary to migrate data from data store 308 back to cookies file 304, since a complete copy is already there.

It will be observed that, since the copy of customization information 306 on data store 308 is only kept up to date while the user is throttled, migration flag 702 identifies those users who have up-to-date entries in data store 308. If a throttled user has an "off" migration flag 702, this indicates either that the user's data has never been migrated to data store 308, or that the user was previously throttled but later "de-throttled." In the case where a previously-throttled user has been "de-throttled," there will be an entry in data store 308 for that user, but the data store entry may not be up-to-date, since the user may have had unthrottled contacts with the web server that caused the customization information to be changed only in cookies file 304. Thus, whenever an "off" migration flag is detected for an unthrottled user, the cookies file data is migrated to data store 308. This covers both the case of an initial throttling (where there is no information for the user in data store 308), as well as a "re-throttling" (where the possibly out-of-date information in data store 308 is re-written with the cookies file data that is known to be current).

Exemplary Data Migration Process Using a Throttle

Figure 8:
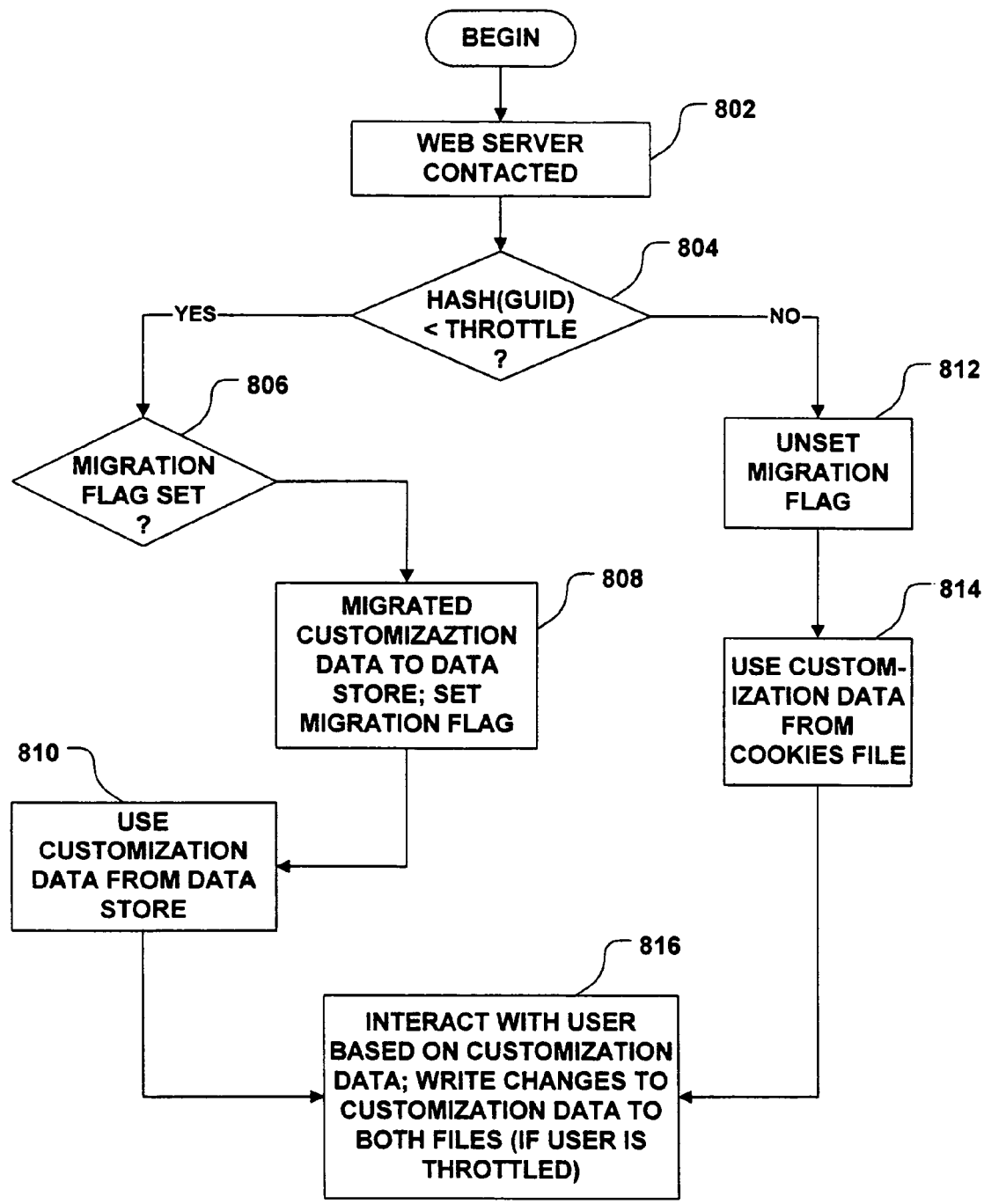
FIG. 8 is a flow diagram showing the process of using a throttle to selectively deploy a feature to a web page in accordance with aspects of the invention.

FIG. 8 shows a process of migrating web site customization data using the throttle of the present invention and the infrastructure described above. At step 802, a contact is made between the web server and the client. Typically, this contact will be initiated by a user's entering the universal record locator (URL) of the web site into the address bar of his or her browser. It should be understood, however, that contact with the web server may be made in any manner. For example, such contact may be made with or without browser software, and with or without an explicit request from the user.

At step 804, it is determined whether a hash of the user's GUID is less than the throttle value. It will be appreciated by those skilled in the art that the test performed at step 804 is an exemplary, but non-limiting, way of differentiating "throttled" users from "non-throttled" users. Use of a hash function in step 804 is preferable, because it tends to distribute the population of throttled and non-throttled users randomly. However, it would be possible to test simply whether the GUID is less than the throttle value, wherein all users having a GUID less than the throttle value would be selected to use server-side data. Moreover, it should be observed that the hash need not be based on the entire GUID, but rather may be based only on certain bits in the GUID. Additionally, it should be observed that the use of the GUID as a basis for distinguishing throttled versus non-throttled uses is merely exemplary. A GUID is a particularly convenient value to use in the context of many web sites, since each user of many web sites is uniquely identified by a GUID. However, it should be appreciated that the invention extends to situations in which no GUID is used. For example, a particular web site may identify users by their E-mail addresses, in which case step 804 could hash the E-mail address and compare the hash of the E-mail address with the throttle value. Any value that identifies the client and which can be obtained by the web site software—e.g., processor serial number, hard disk serial number, etc.—or a hash of such value, may be used at step 804 without departing from the spirit and scope of the invention.

Moreover, it should be understood that the comparison performed at step 804 may be performed either at the client or the server. As one example, the web page provided by the web server may contain a script that executes on the client in order to obtain the GUID from the client's cookies file and compare that GUID (or a hash thereof) with the pre-set throttle value. Alternatively, the web page may contain instructions to obtain the GUID from the client's cookies file and transmit it back to the web server, whereupon the comparison is performed by the web server. So long as the comparison is performed so that there is a basis for distinguishing throttled users from non-throttled users, it makes no difference whether the comparison is performed on the client or on the server.

If it is determined at step 804 that the hash of the GUID is less than the throttle value, then the user is "throttled" and the process branches to step 806 so that server-side customization data may be used. At step 806, it is determined whether a migration flag is set for the user. As discussed above, the migration flag is set at the time that data is first migrated from the client to the server, and is unset whenever the user is unthrottled. Thus, if the migration flag is not set, then either the user's customization data has never been stored in data store 308 (in the case of a user has never been throttled), or the information for that user in data store 308 may be out of date (in the case of a user who has been previously throttled and later de-throttled). On the other hand, if the migration flag is set, then it must be the case that the last contact between the web server and the user was a "throttled" contact in which any changes to the user's customization profile were stored in data store 308 (and thus the data store 308 entry for the user is up-to-date). Therefore, it is possible to determine whether the server has up-to-date information for the user simply by checking the migration flag. If the migration flag is not set, processing continues to step 808, wherein the current customization data from the cookies file is migrated to the data store 308 on the server. Also at step 808, the migration flag is set, so that such migration will not need to be performed the next time a throttled contact is made between the server and the client. If it is determined at step 806 that the migration flag is set, then step 808 is omitted. When the user is "throttled," data from the server-side store is used for the session (block 810), regardless of whether step 808 is performed for the current contact with the server.

If it is determined at step 804 that the hash of the GUID is not less than the throttle value, then the user is "unthrottled." An unthrottled user is one who is not designated to use the server-side data store, and thus the cookies file is used as the source of customization data for such user. If the user is unthrottled, the migration flag in that user's cookies file is unset (step 812). (The migration flag may already be unset from a previous unthrottled contact with the user; in this case, it is unnecessary to unset the migration flag again, but doing so causes no harm.) Because the user is unthrottled, customization data from the user's cookies file is used (block 814).

Regardless of whether the user is throttled or unthrottled, step 816 is reached, whereupon the user interacts with the server by using the browser, and the interaction is based on the customization data obtained from either the cookies file (in the case of unthrottled users), or the server-side data store 306 (in the case of throttled users). Thus, if the customization information indicates that the user's zip code is 98052, then the weather report for Redmond, Wash. may be displayed. The interaction that takes place at step 816 may include events that change the customization information for the user. For example, as part of the interaction, the user may indicate that his zip code has changed, and that information needs to be stored in the user's customization information. If the user is throttled, then the new information is stored in both the server-side data store 308 and in the client-side cookies file 304. However, if the user is unthrottled, then any changes to the customization data are stored only in cookies file 304. As noted above, under this scheme any user (whether throttled or unthrottled) always has an up-to-date cookies file, but only throttled users are guaranteed to have an up-to-date entry in data store 308, and migration flag 702 indicates whether data store 308 has an up-to-date copy of the customization information.

It should also be noted that the act of maintaining mirror copies of the customization data need not be carried out forever. It may be the case that, once the administrator of web site 200 is satisfied that data store 308 is working properly, they may simply turn the throttle up to its maximum value in order to cause all users to be migrated. At that time, the web site administrator may discontinue the maintenance of mirror copies of data.

Incremental and Reversible Feature Deployment

The throttle of the present invention has been described with reference to its use in migrating user data for a web site from a client location to a server location. However, it should be appreciated that this context for the throttle is merely exemplary, and various aspects of the invention may be used in other contexts.

In general, a throttle may be used to incrementally and reversibly deploy features that are being tested. In this sense, data store 308 is an example of a feature to be deployed. However, it should be appreciated that other types of features are capable of incremental and reversible deployment, and a throttle may be used for that deployment. For example, the providers of a web site may design a new user interface (e.g., new menus, new font, new audio, etc.), and they may wish to test that new interface on a small segment of the population in order to "market-test" their reaction to the new interface before deploying the feature to the population at large.

Similarly, the manufacturer of a software package may wish to test a new feature on a small segment of software users. Thus, the software may contain code which encourages its operator to contact the manufacturer's web site periodically for upgrades. When the web site is contacted, an upgrade (e.g., in the form of a replacement .exe or .dll file) may be provided to a small percentage of users, where a throttle is used to select users to receive the new feature based on the serial number of the user's copy of the software, the serial number of the user's processor, or some other parameter that identifies the user or his computing device (or a hash of such a parameter). Depending upon the circumstances and the way the upgrade is implemented, it may or may not be possible to reverse this type of deployment by turning down the throttle; however, a throttle in accordance with the invention could be used to deploy this type of feature incrementally.

Moreover, web site customization data is merely exemplary of the type of data that can be migrated using the throttle of the present invention. For example, a distributed database may initially store records and various locations throughout a network, and the administrator of the database may wish to relocate that data to a centralized data store without performing the entire relocation all at once. A throttle in accordance with the invention may be used to select database records for migration. For example, each record may have a tag number, where the throttle selects database records to be migrated to the central store based on their tag number or a hash thereof.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of migrating data items, each of said data items being associated with an identifier, said method comprising the acts of:
   storing an adjustable throttle value;
   for a first of said data items, computing a first index value based on an identifier associated with said first data item;
   determining that the relationship between said first index value and said throttle value meets pre-determined criteria; and
   copying said first data item to a data store,
wherein each of said data items comprises customization information for a web page, each of said data items being stored on a computing device to which the customization relates, said method further comprising the acts of:
   providing a web page to a first one of the computing device based at least in part on information copied to said data store;
   adjusting said throttle value downward;
   determining that said the relationship between said first index value and the downward-adjusted throttle value does not meet said pre-determined criteria; and
   providing a web page to one of the computing devices without using the information copied to said data store.

2. A system for migrating web site data comprising:
   means for storing an operator-adjustable value;
   means for selecting a group of users of said web site based on an identifier associated with each of said users and further based on said operator-adjustable value;
   means for transferring data from the selected users' computing devices to a data store;
   means for adjusting said operator-adjustable value downward;
   means for de-selecting at least some of the selected users in response to the downward adjustment of said user-adjustable value; and
   means for rendering a web page based at least in part on data stored on the de-selected users' computing devices.

3. The system of claim 2, further comprising:
   means for indicating the validity of the data store copy of said users' data including a flag stored on each of said users' computing devices;
   means for invalidating the data store data for the de-selected users using said flag.

* * * * *